Aug. 25, 1953      D. E. GOMMEL      2,649,868
MOUNTING ROTORS ON ARBORS OF VARIOUS TRANSAXIAL CONTOURS
Filed July 5, 1951
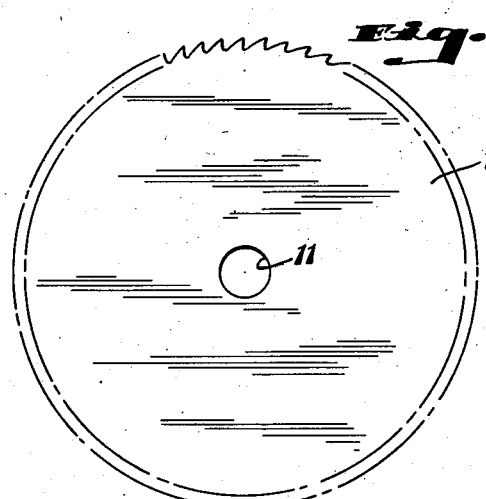
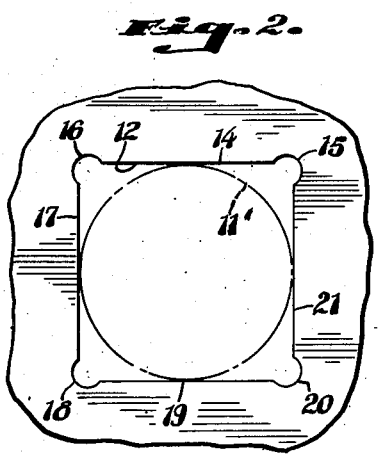
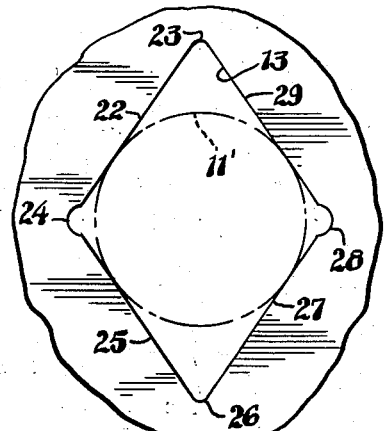
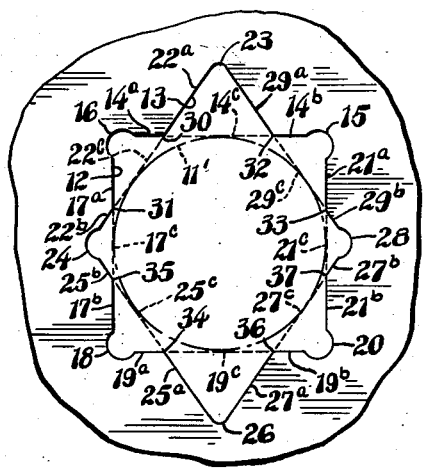
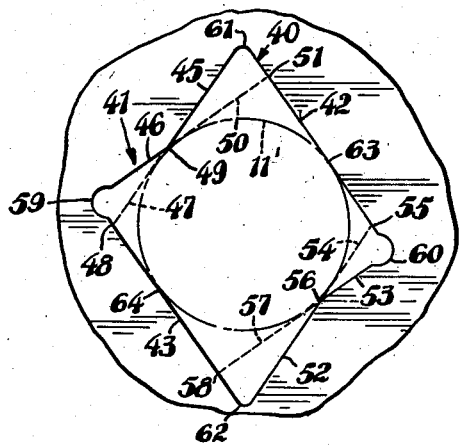
INVENTOR.
DEWEY E. GOMMEL,
BY:
ATTORNEY.

Patented Aug. 25, 1953

2,649,868

UNITED STATES PATENT OFFICE 2,649,868

MOUNTING ROTORS ON ARBORS OF
VARIOUS TRANSAXIAL CONTOURS

Dewey E. Gommel, Indianapolis, Ind., assignor, by
mesne assignments, to Borg-Warner Corporation, Chicago, Ill., a corporation of Illinois Application July 5, 1951, Serial No. 235,340

2 Claims. (Cl. 143—155)

The present invention relates to mounting rotors or rotary tools on arbors of various transaxial contours. There are, on the market today, several different power-driven, portable or stationary machines upon the arbors of which separate rotary tools are intended to be selectively mounted. Some of these machines are provided with arbors of circular cross section, at least one is provided with an arbor of square cross section having a side equal to the diameter of the circular arbors, and at least one other is provided with an arbor of rhombic cross section, the perpendicular distance between the sides of which is equal to said diameter. It is the primary object of the present invention to provide rotary tools so constructed that any such tool may be firmly mounted, at will, upon any one of the above-described arbors of different cross sectional contours. To that end, I have designed an eye of novel perimetral contour, that contour being of such character that the eye will snugly receive, and will have suitable bearing upon, a mandrel of any one of the three contours above mentioned.

My invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is an elevation, more or less diagrammatic, of a conventional rotary tool such as a circular saw blade;

Fig. 2 is a fragmentary elevation, upon an enlarged scale, of a square eye formed in such a tool;

Fig. 3 is a similar view showing a rhombic eye;

Fig. 4 is a similar view showing a combination eye, of a form known prior to the present invention, capable of application to an arbor of square section or of rhombic section; and Fig. 5 is a similar view showing the eye of the present invention so designed as to be applicable to an arbor of square section, or rhombic section, or of circular section of the conventional relative dimensions referred to above.

Referring more particularly to the drawings, it will be seen that, in Fig. 1 I have illustrated a conventional form of circular saw blade 10 formed with a concentric circular eye 11. This blade, of course, can be successfully mounted only upon an arbor of correspondingly circular cross section.

One commercial form of machine upon which rotary tools may be selectively mounted is provided with an arbor of square cross section whose dimensions are such that a square eye 12 proportioned to fit such arbor will tangentially circumscribe a circle 11' corresponding to the eye 11. Otherwise stated, the square arbor for which the eye 12 is designed, has a side equal to the diameter of the conventional cylindrical arbor for which the eye 11 is designed. Because of these dimensional characteristics, a tool provided with an eye 12 designed to fit such a square arbor can also be mounted upon the same arbor for which the conventional eye 11 is designed, the eye 12 having bearing upon such a circular arbor at four points angularly spaced 90° from each other, as clearly indicated in Fig. 2.

Another commercial machine is provided with an arbor of rhombic cross section; and rotary tools primarily intended for mounting on that machine are provided with an eye 13, as illustrated in Fig. 3. It will be noted that tools provided with the eye 13 may also be mounted upon the conventional arbor of circular cross section, the four walls of the rhombic eye having tangential bearing, at four angularly spaced points, upon an arbor whose periphery is indicated at 11'. In other words, the rhombic arbor for which the eye 13 is designed has its parallel sides spaced apart a perpendicular distance equal to the diameter of the conventional cylindrical arbor for which the eye 14 is designed.

The square eye is defined by parallel sides 14 and 19 and parallel sides 17 and 21, the sides 14 and 17 intersecting at 16, the sides 17 and 19 intersecting at 18, the sides 19 and 21 intersecting at 20, and the sides 21 and 14 intersecting at 15.

The rhombic eye 13 is defined by parallel sides 22 and 27 and parallel sides 25 and 29, the sides 22 and 25 intersecting at 24, the sides 25 and 27 intersecting at 26, the sides 27 and 29 intersecting at 28, and the sides 29 and 22 intersecting at 23.

Heretofore, it has been known to provide a combination eye for fitting either a square arbor or a rhomic arbor, that combination eye being produced by superimposing the eye 13 upon the eye 12 with the diagonals of the rhombic eye 13 coinciding with the perpendicular bisectors of the sides of the square eye 12. The resultant combination eye is illustrated in Fig. 4. It will be seen that the section 22a of the rhombic eye cuts the edge 14 of the square eye at 30, leaving a wall section 14a between the points 30 and 16 for bearing engagement with a square arbor; the section 22b of the edge 22 of the rhombic eye cuts the edge 17 of the square eye at 31, leaving a section 17a between the points 31 and 16 for bearing engagement with the square arbor, but destroying or eliminating the section 22c of the edge 22 of the rhombic eye between the points 30 and 31. Similarly, the edge 25 of the rhombic eye cuts the edge 19 of the square eye at 34 and cuts the edge 17 of the square eye at 35, leaving sections 19a and 17b for bearing engagement with the square arbor, but cutting away the section 25c of the edge 25 of the rhombic eye and the section 17c of the edge 17 of the square eye.

The edge 27 of the rhombic eye cuts the edge 19 of the square eye at 36 and the edge 21 of the square eye at 37; and the edge 29 of the rhombic eye cuts the edge 14 of the square eye at 32 and the edge 21 of the square eye at 33.

In this combination eye, then, sections 22a, 22b, 25b, 25a, 27a, 27b, 29b and 29a remain for bearing engagement with a rhombic arbor; sections 14a, 17a, 17b, 19a, 19b, 21b, 21a and 14b remain for bearing engagement with a square arbor; but sections 14c, 22c, 17c, 25c, 19c, 27c, 21c and 29c are cut away. As is clearly shown in Fig. 4, the circle 11', which is commonly circumscribed by the square eye 12 and the rhombic eye 13, is tangent to those eyes only within the particular "c" regions which are removed when the combination eye is formed; and therefore a tool provided with this previously-known combination eye, while it is applicable to the conventional square arbor or to the conventional rhombic arbor, is not applicable to the conventional arbor of round cross section whose diameter is equal to the perpendicular distance between the parallel sides of the conventional square arbor or the conventional rhombic arbor.

I have discovered that, by rotating the position of the square eye relative to the rhombic eye, before superposing one upon the other, it is possible to bring the two eyes into such a relation that, when they are superposed, the resultant combination eye will be provided with wall surfaces tangent to the common circumscribed circle. Thus, in Fig. 5, I have shown a combination eye constituting a combination of a rhombic eye 40 dimensionally identical to the eye 13 and a square eye 41 dimensionally identical to the eye 12; but in the combination of Fig. 5, the perpendicular bisectors of the sides of the square are angularly spaced from the diagonals of the rhomb to an extent dependent upon the values of the obtuse angles of the rhomb. Otherwise expressed, the square 41 has been rotated, about the center of the common circumscribed circle until two opposite sides of the square have been brought into coincidence with two opposite sides of the rhomb.

Referring to Fig. 5, it will be seen that the combination eye is defined by two parallel rectilinear sides 42 and 43 which are superimposed upon, but each of which extends in one direction beyond, a rhomb tangentially circumscribing the circle 11'; and by two other sides each of which comprises two angularly related sections. Thus, a third side of the combination eye comprises a section 45 which coincides with a portion of one side of the said rhomb, and a section 46, angularly related to the section 45 and intersecting the section 45 at a point 49 slightly offset from the point of tangency of said section 46 with the circle 11'. One side of the square 41 is directly superimposed upon the side 42 of the rhomb, while an opposite side of the square coincides with the side 43 of the rhomb. An extension 47 of the section 45 would meet the side 43 at 48; and an extension 50 of the section 46 would meet that side of the square which is superimposed on the rhomb side 42, at 51.

A section 52 of the fourth side of the combination eye is directly superimposed upon a portion of the fourth side of the rhomb, while the other section 53 of said fourth side of the combination eye is directly superimposed upon the fourth side of the square 41. An extension 54 of the section 52 would meet the side 42 of the rhomb 40 at 55, while an extension 57 of the section 53 would complete the square 41 at 58. Of course, it will be understood that the extensions indicated at 47, 50, 54 and 57 are cut away in the formation of the combination eye of the present invention.

Now, it will be seen that the eye herein disclosed provides improved bearing for the tool upon a square arbor or a rhombic arbor whose opposite sides are spaced apart by a perpendicular distance equal to a side of the square arbor, as compared with the previously known eye of Fig. 4, and at the same time provides for bearing of the tool upon an arbor of circular section with a diameter equal to a side of that same square arbor, which is totally impossible with the eye of Fig. 4. Thus, the walls 42 and 43 of the eye of Fig. 5 provide bearing throughout the total dimension of two opposite walls of a square arbor or of a rhombic arbor. The new eye also provides bearing between the points 49 and 59 and between the points 56 and 60 for a square arbor, while providing bearing between the points 49 and 61 and between the points 56 and 62 for a rhombic arbor. At the same time, it provides tangential bearing at points 63 and 64 for a conventional cylindrical arbor having a diameter equal to a side of the conventional square arbor and to the perpendicular distance between parallel sides of a conventional rhombic arbor, and provides substantial bearing, as well, for such a cylindrical arbor, at points 49 and 56. Thus, assuming an arbor of $1\frac{3}{8}$ inch diameter, the points 49 and 56 will allow play of only 0.010" therebetween.

I claim as my invention:

1. A rotary tool adapted for mounting selectively on arbors of round, square or rhombic cross-section, said tool having a central eye defined by two parallel sides respectively superimposed upon two opposite sides of a rhomb concentric with said tool, and by two other sides each having a portion superimposed upon another side of such rhomb and each having another portion superimposed on a side of a square concentric with said tool, such square having two other sides respectively superimposed on the first-named sides of such rhomb.

2. A rotary tool adapted for mounting selectively on arbors of round, square or rhombic cross-section, said tool having a central eye defined by two rectilinear parallel sides respectively superimposed upon two opposite sides of a rhomb tangentially circumscribing a circle concentric with said tool, and by two other sides, each of said other sides comprising a rectilinear portion meeting one of said first sides and superimposed upon another side of such rhomb, and a second rectilinear portion meeting the other of said first sides and angularly meeting its first-named portion, each such second portion being superimposed upon a side of a square tangentially circumscribing said circle and having two sides superimposed respectively on the first-named sides of said rhomb.

DEWEY E. GOMMEL.

References Cited in the file of this patent

UNITED STATES PATENTS

| Number | Name | Date |
|---|---|---|
| 1,725,238 | Williams | Aug. 20, 1929 |
| 2,535,382 | Bachli et al. | Dec. 26, 1950 |